United States Patent
Xie et al.

(10) Patent No.: US 11,753,575 B2
(45) Date of Patent: Sep. 12, 2023

(54) ORGANIC-INORGANIC NANOCOMPOSITE GEL AND OIL-BASED DRILLING FLUID

(71) Applicant: Southwest Petroleum University, Chengdu (CN)

(72) Inventors: Gang Xie, Chengdu (CN); Ruolan Wang, Chengdu (CN); Jinjun Huang, Chengdu (CN); Yang Bai, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/802,545

(22) PCT Filed: Jun. 16, 2022

(86) PCT No.: PCT/CN2022/099052
§ 371 (c)(1),
(2) Date: Aug. 26, 2022

(87) PCT Pub. No.: WO2022/267968
PCT Pub. Date: Dec. 29, 2022

(65) Prior Publication Data
US 2023/0118402 A1  Apr. 20, 2023

(30) Foreign Application Priority Data
Jun. 22, 2021 (CN) .......................... 202110694702.4

(51) Int. Cl.
*C09K 8/512* (2006.01)
*C08F 220/06* (2006.01)
(Continued)

(52) U.S. Cl.
CPC ............ *C09K 8/512* (2013.01); *C08F 220/06* (2013.01); *C08F 220/56* (2013.01); *C08K 9/06* (2013.01);
(Continued)

(58) Field of Classification Search
CPC ...... C09K 8/512; C09K 8/34; C09K 2208/10; C08F 220/06; C08F 220/56; C08F 9/06; C08F 2800/20; C08F 2810/20
See application file for complete search history.

(56) References Cited

U.S. PATENT DOCUMENTS 4,045,400 A * 8/1977 Korshak ................. C08K 5/51
508/108
4,202,780 A * 5/1980 Brendle ................... C10M 7/00
508/230
(Continued)

FOREIGN PATENT DOCUMENTS

| CN | 105862426 A | 8/2016 |
|----|-------------|--------|
| CN | 110982369 A | 4/2020 |

(Continued)

*Primary Examiner* — Alicia Bland

(57) ABSTRACT

The invention discloses an organic-inorganic nanocomposite gel sealing agent and oil-based drilling fluid. The sealing agent used for the oil-based drilling fluid is organic-inorganic nanocomposite gel, and the synthetic raw materials of the organic-inorganic nanocomposite gel includes molybdenum disulfide, 2-ethyl acrylic acid, N, N-dimethylacrylamide and N,N-methylene bisacrylamide; the drilling fluid includes the organic-inorganic nanocomposite gel provided by the invention. The organic-inorganic nanocomposite gel is used as a nano sealing agent, the particle size distribution of the organic-inorganic nanocomposite gel is 50-200 nm, the organic-inorganic nanocomposite gel can effectively prevent drilling fluid filtrate from intruding into stratums and prevent accidents such as borehole wall collapse, the organic-inorganic nanocomposite gel is particularly suitable for nano-sealing of shale stratums, and the preparation method of the organic-inorganic nanocomposite gel is reliable in principle and has a wide market prospect.

7 Claims, 2 Drawing Sheets

(51) Int. Cl.
*C08F 220/56* (2006.01)
*C08K 9/06* (2006.01)
*C09K 8/34* (2006.01)

(52) U.S. Cl.
CPC ............ *C09K 8/34* (2013.01); *C08F 2800/20* (2013.01); *C08F 2810/20* (2013.01); *C09K 2208/10* (2013.01)

(56) References Cited

U.S. PATENT DOCUMENTS

| | | | |
|---|---|---|---|
| 4,508,761 A | | 4/1985 | Miyoshi et al. |
| 4,708,821 A | * | 11/1987 | Shimokawa .......... C10M 173/02 516/108 |
| 5,792,727 A | * | 8/1998 | Jacobs .................... C09K 8/14 507/140 |
| 2003/0088013 A1 | * | 5/2003 | Kudo ....................... C09K 3/10 524/495 |
| 2015/0198008 A1 | * | 7/2015 | Smith .................... E21B 34/00 166/386 |

FOREIGN PATENT DOCUMENTS

| | | |
|---|---|---|
| CN | 111363106 A | 7/2020 |
| CN | 112940836 A | 6/2021 |

\* cited by examiner

ORGANIC-INORGANIC NANOCOMPOSITE GEL AND OIL-BASED DRILLING FLUID

FIELD OF THE INVENTION

The present invention relates to drilling technologies in the oil and gas field, and more particularly to an organic-inorganic nanocomposite gel sealing agent and an oil-based drilling fluid including the nano-sealing agent.

BACKGROUND OF THE INVENTION

During the development of oil and gas resources, the mining of deep shale gas has always been research hotspots in researchers. For some stratum with hard brittleness and fragility caused by hierarchical seams and micro pores, the intrusion of oil-based drilling liquid filtrate will bring an unstable factor for the stratum. In addition, hydraulic pressure through micro pores and seams can also cause the well wall to be stable, and therefore, the sealing property of the oil-based drilling fluid must be strengthened. At present, there are few types of sealing agents of oil-based drilling wells, and the sealing materials used are mostly bridge-like materials that only have hydrophilic performance, and the adaptability in the oil-based drilling fluid is poor, and the particle size matching ability is insufficient. At the same time, the change in the pressure of the well hole will cause changes in the size of the pores and seams, and dynamic deformation of the pores and seams causes damage to the sealing layer. The sealing layer formed by the non-elastic sealing agent cannot be adapted to the aperture deformation, which will affect the sealing effect; and elastic sealing agents can better adapt to the deformation of the pores and seams, and the sealing effect is stable. At the same time, when the drill string is lifted, the pressure of the inner liquid column is lowered due to pumping effect, thus when the sealing material is not strongly adsorbed to the well wall, the sealing material in the aperture may be displaced under the action of pumping pressure. Therefore, a synthesis of an organic-inorganic nanocomposite gel sealing agent and oil-based drilling fluid is studied.

Organic-inorganic nanocomposite segments are a nanometer sealing material that enters nanopores and seams in pressure, its rigid core can function as a support for bridge, and the flexible polymer housing can be deformed to fill the effect of the micro pores and seams, a seal and block function of a plurality of doses is achieved, and its oelophilic group can make it a good dispersion in the oil-based drilling fluid.

SUMMARY OF THE INVENTION

Aiming at the current conventional sealing agent cannot effectively seal the nanopores and seams in the shale, the present invention provides an organic-inorganic nanocomposite gel sealing agent having a particle size of nanometers, and it is possible to effectively seal the nanoscale pores and seams in the shale formation, thereby achieving the purpose of stabilizing the wall. It has been developed a new nano-sealing oil-based drilling fluid that can be applied to shale formations, which can solve the stability of the well, reservoir contamination.

In order to achieve the above object, the technical solution of the present invention is: an organic-inorganic nanocomposite gel sealing agent and an oil-based drilling fluid. The raw material of the organic-inorganic nanocomposite gel sealing agent includes molybdenum disulfide, 2-ethylacrylic acid, N, N-dimethylacrylamide, the organic-inorganic nanocomposite gel sealing agent is prepared as follows:

(1) Modification of nano molybdenum disulfide: place the nano molybdenum disulfide in 75-80° C. vacuum drying tank to dry for 10-12 hours, accurately weigh 2-3 g of the nano molybdenum disulfide after drying, add to 40-50 ml ethanol/water of dispersion, ultrasonic dispersion 40-50 min, then 2-3 g KH550 was added dropwise while stirring, after reaction 8-10 hours at 75-80° C., washed with ethanol, repeated 3-5 times, finally placed in 55-60° C. vacuum drying tank drying for 8-10 hours to obtain a modified nano molybdenum disulfide.

(2) Preparation of organic-inorganic nanocomposite gel:
① Adding the modified nano molybdenum disulfide to a reactor, adding ultra-pure water, ultrasonic dispersion of 10-15 min.
② Add comonomer of 2-ethyl acrylic acid and N, N-dimethylacrylamide, crosslinker of N, N-methylene bisacrylamide, keep rapid stirring to dissolve, and enter nitrogen 20-30 min.
③ The reaction system was warmed to 55-60° C., and stirred, and ammonium persulphate was added to the mixing system, and then constant temperature reaction for 3-4 h.
④ After the reaction was completed, the reaction system was reduced to 20-25° C., and the prepared sample was washed with distilled water to neutral, and then dried in 60-70° C. oven.
⑤ Grind the dried samples and seal it.

The dosage of modified nano molybdenum disulfide is 5-15% of the total weight of 2-ethyl acrylic acid and N, N-dimethylacrylamide.

The dosage of 2-ethyl acrylic acid is 3-3.5 g.

The weight ratio of 2-ethyl acrylic acid and N, N-dimethylacrylamide is 1: 1-2.5.

The dosage of N, N-methylene double acrylamide is 1% to 3%.

The dosage of ammonium persulphate is 1% to 3%.

Another object of the present invention is to provide an oil-based drilling fluid added the organic-inorganic nanocomposite gel sealing agent according to the present invention.

The composition of the drilling fluid is as follows: 70-100 parts of white oil, 0.5-1 part of the main emulsifier, 1-3 parts of the coemulsifier, 5-10 parts of the filtration loss reducing agent, 2-5 parts of organic soil, 1-5 parts of quicklime, 10-30 parts of $CaCl_2$) brine (20-25% concentration), 0.5-2 parts of wetting agent, 10-50 parts of barite, 1-5 parts of the organic-inorganic nanocomposite gel sealing agent.

The white oil in the oil-based drilling fluid is 3 #white oil, the main emulsifier is selected from one of OME, HIEMUL and HW Pmul-1, the coemulsifier is selected from one of OME-2, HICOAT and HW Smul-1, the wetting agent is HW Wet-1, the filtration loss reducing agent is one of oxidized asphalt, YJ-2 and HWTrol-101, the organic soil is HW Gel-3, and the density of barite is 4.2 g/cm$^3$.

The pH of the oil-based drilling fluid is in a range of 8.5-10.

The density of the oil-based drilling fluid is 1.55 g/cm$^3$ when no organic-inorganic nanocomposite gel sealing agent is added therein.

The beneficial effects of the present invention are as follows:

The particle size of the organic-inorganic nanocomposite gel prepared by the present invention is in a range of 50-200 nm, which can effectively seal or block the nanometer pores and seams in the shale formation, thereby achieving the effect of stabilizing the wall. The oil-based drilling fluid according to present invention is good in rheology, stability, and sealing properties in shale formation conditions.

DETAILED DESCRIPTION OF EMBODIMENTS

Figure 1:
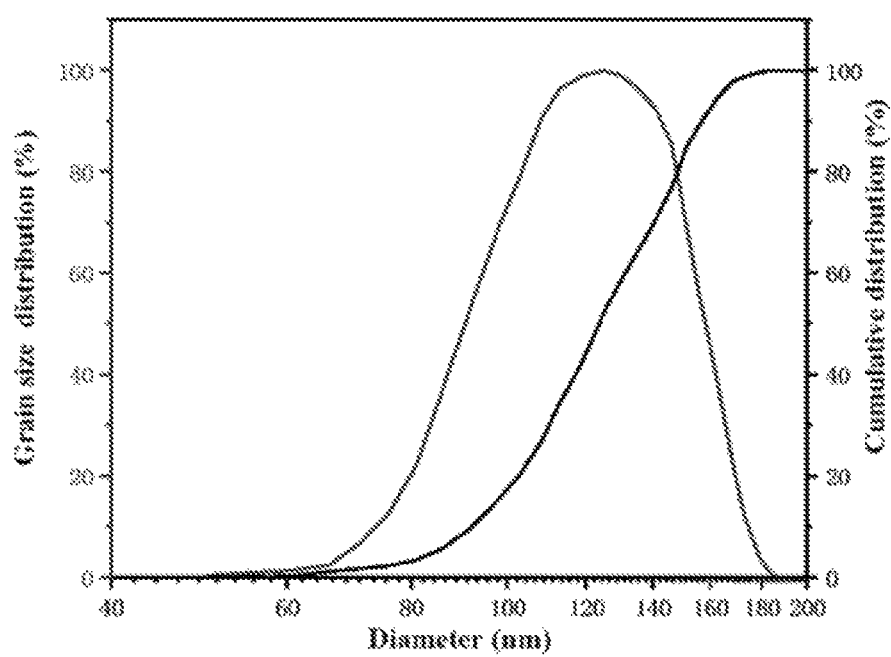
FIG. 1 shows a particle size distribution of the organic-inorganic nanocomposite gel in accordance with embodiment 1.

The technical solutions of the present invention will be described in the following in conjunction with the embodiment of the present invention, and it is understood that the described embodiments are merely, not all of the embodiments of the invention. Based on the embodiments of the present invention, there are all other embodiments obtained without making creative labor without making creative labor premises.

First, the preparation of organic-inorganic nanocomposite gel:

Embodiment 1

Modification of nano molybdenum disulfide: nano molybdenum disulfide is placed in a 75° C. vacuum drying tank for drying 12 h, after drying, accurately weigh 2 g of the nano molybdenum disulfide, then added to 40 ml ethanol/water dispersion, ultrasonic dispersion 45 min, Then, 2.5 g KH550 was added dropwise while stirring, after reaction 9 h under 75° C., it was washed with ethanol, repeated 4 times, and finally was dried in a 58° C. vacuum drying tank for 10 h to obtain a modified nano molybdenum disulfide.

Preparation of organic-inorganic nanocomposite gel: 0.3 g of modified nanomolybdenum disulfide was added to the reactor, 50 ml of ultrapure water was added to the ultrasonic dispersion for 12 min, 3 g of comonomer 2-ethylacrylic acid and 3 g of N, N-dimethacrylamide, 0.04 g of crosslinker N, N-methylene bisacrylamide, keep rapid stirring until dissolved, enter into the nitrogen for 25 min, the reaction system was heated to 55° C., kept stirred, and 0.06 g of ammonium persulphate was added to the mixing system, reaction 3 h under constant temperature. After the reaction is completed, the reaction system is reduced to 22° C., the prepared sample is washed with distilled water to neutral, and then dried at 65° C. in an oven.

Embodiment 2

Modification of nano molybdenum disulfide: the nano molybdenum disulfide is placed in a vacuum drying tank at 80° C. for 12 h, accurately weigh the dried nano-molybdenum disulfide 2.5 g, added to the dispersion of 45 mL ethanol/water, ultrasonically dispersed for 50 min, and then added 3 g KH550 dropwise while stirring, after reacting at 80° C. for 8 h, washed with ethanol, repeated 5 times, and finally placed in a vacuum drying tank at 60° C. to dry for 9 h to obtain modified nano molybdenum disulfide.

Preparation of organic-inorganic nanocomposite gel: 0.65 g of modified nanomolybdenum disulfide is added to the reactor, 50 ml of ultrapure water was added for ultrasonical disperse 15 min, then 3 g of copolymer monomer 2-ethyl-acrylic acid and 3.5 g of N, N-dimethacrylamide, 0.05 g crosslinker of N, N-methylene bisacrylamide are added, keep rapid stirring until dissolved, streaming into nitrogen gas 30 min; the reaction system was heated to 60° C., keep stirring, 0.08 g of ammonium persulphate was added to the mixed system, constant temperature reaction for 4 h; after the reaction was completed, the reaction system was reduced to 25° C., the prepared sample was washed with distilled water to neutral, and then dried at 70° C. in an oven.

In order to further illustrate the effect of the organic-inorganic nanocomposite gel sealing agent and oil-based drilling fluid of the present invention, the organic-inorganic nanocomposite gel sealing agent and oil-based drilling fluid prepared in Example 1, Example 2 are subjected to performance testing.

Second, Performance Testing

1. Organic-Inorganic Nanocomposite Gel Sealing Agent Particle Size Test

Figure 2:
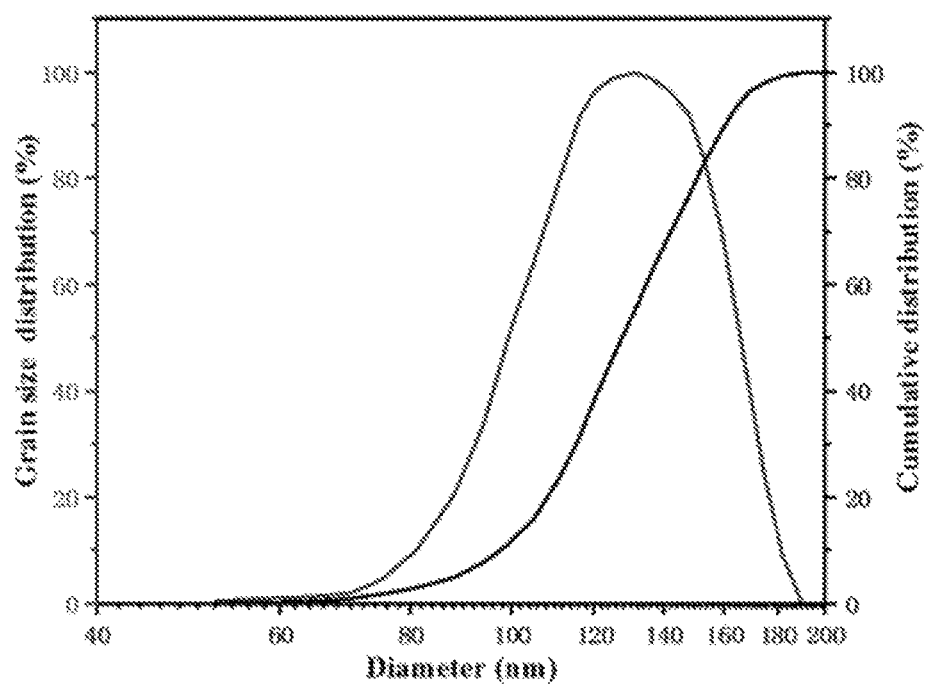
FIG. 2 shows a particle size distribution of the organic-inorganic nanocomposite gel in accordance with embodiment 2.

Using the BI-200SM laser scatterer produced by Brookhaven Instruments in the United States, the nano-microemulsion sealing agent was tested for particle size, and the organic-inorganic nanocomposite gel sealing particle size test results prepared in the above two embodiments are shown as FIG. 1, FIG. 2. The Organic-inorganic nanocomposite gel sealing agent of the present invention has a particle size distribution between 50-200 nm, the average particle size of 125 nm, indicating that the present invention synthesized plugging agent is nano-sized, and the sealing agent distribution range is wide, can effectively seal or block nanopores and seams of different nanosize sizes.

2. Rheological Performance of Drilling Fluid and Performance Test of Water Loss Wall Building.

The present invention is mainly described in the following specific formulations of the organic-inorganic nanocomposite gel sealing agent application. Based on 100 parts of white oil of mass, the composition of the drilling fluid is as follows: 0.5-1 part of main emulsifier, 1-3 parts of coemulsifier, 5-10 parts of filtration loss reducing agent, 2-5 parts of organic soil, 1-5 parts of quicklime, 10-30 parts of $CaCl_2$) brine with 20-25% concentration, 0.5-2 parts of wetting agent, 10-50 parts of barite, 1-5 parts of the sealing agent made of the organic-inorganic nanocomposite gel.

Third, the configuration of oil-based drilling fluid:

The 1.80 g of the main emulsifier HW Pmul-1, 4.50 g of auxiliary emulsion HW Smul-1, 2.40 g of wetting agent HW Wet-1 is directly weighed in the high mixer cup; the amount of 240 mL of 3 #white oil is introduced into the high mixer cup, the high mixer cup is placed on the high mixer, stirred at a high speed of 12000 rpm, stirred for 10 min, weigh with cellophane 9 g of organic soil HW Gel-3, in the high stirring state, the organic soil HW Gel-3 is slowly added to the high mixer cup to prevent splashing, high stirring for 10 min, in the high stirring state, 60 mL amount of $CaCl_2$ aqueous solution with a concentration of 25% is added to the high stirrer to prevent splashing and stir for 10 min, in the high stirring state, 9 g of quicklime HW-pH is slowly added to the high stirrer cup and stir for 10 min, in the high stirring cup state, the 24 g filter loss reducing agent HW Trol-101 is slowly added to the high stirrer cup, stirred for 10 min, and the high stirrer cup is removed to scrap wall; in the high stirring state, 295 g of barite is slowly added to the high stirrer cup, continue to stir for 30 min, during which the high stirrer cup is removed and the wall is scraped again.

After stirring evenly, the organic-inorganic nanocomposite gel sealing agent prepared above, respectively 0 g, 4 g, 8 g, 12 g, 16 g, was added to 5 copies of oil-based drilling fluid base slurry, thus five drilling fluids containing organic-inorganic nano-composite gel sealing agents were prepared, respectively named base slurry, drilling fluid 1, drilling fluid 2, drilling fluid 3 and drilling fluid 4, of which the base slurry did not contain the organic-inorganic nanocomposite gel sealing agent, and is used as a blank experimental group.

According to People's Republic of China standard GB/T 16783.2-2012 "Oil and Gas Industry Drilling Fluid Field Test Part 2: Oil-based Drilling Fluid", the rheology and water loss wall building of the drilling fluid prepared by the step are tested separately, and the results are recorded in Table 1.

TABLE 1

Rheological performance and filtration loss performance of drilling fluid recording table

| | After aging 150° C./16 h | | | | | | |
|---|---|---|---|---|---|---|---|
| name | AV | PV | YP | YP/PV | API/mL | HTHP/mL | Emulsion breaking Voltage/V |
| Base slurry | 32.00 | 26.00 | 6.13 | 0.24 | 4.80 | 6.30 | 623 |
| drilling fluid 1 | 36.50 | 30.00 | 6.64 | 0.22 | 3.60 | 5.20 | 728 |
| drilling fluid 2 | 40.50 | 33.00 | 7.67 | 0.23 | 3.20 | 4.20 | 746 |
| drilling fluid 3 | 42.50 | 34.00 | 8.69 | 0.26 | 2.80 | 3.80 | 768 |
| drilling fluid 4 | 45.00 | 37.00 | 8.18 | 0.22 | 2.40 | 3.40 | 784 |

Note: AV-apparent viscosity, the unit is mPa·S, PV-plastic viscosity, the unit is mPa·s; YP-dynamic shear force, the unit is Pa; API-normal temperature medium pressure filtration loss, the unit is mL; HTHP-high temperature and high pressure filtration loss, the unit is mL.

It can be seen from the results shown in Table 1 that compared with the drilling fluid without the addition of organic-inorganic nanocomposite gel sealing agent, when the organic-inorganic nanocomposite gel is added to the drilling fluid by 4-16 mass parts, the performance of the drilling fluid is not significantly affected, indicating that the drilling fluid sealing agent has good compatibility performance. With the increase of the amount of organic-inorganic nanocomposite gel sealing agent, the apparent viscosity and plastic viscosity of the drilling fluid gradually increase under the same experimental conditions, and the impact on shear force is small. After aging for 16 h at 150° C., with the increase of the amount of organic-inorganic nanocomposite gel sealing agent, the filtration loss of high temperature and high pressure is gradually reduced, and the filtration loss of high temperature and high pressure is the smallest when the amount is 12 mass parts, indicating that the organic-inorganic nanocomposite gel plugger has good rheological properties and water loss wall building performance, which can effectively reduce the high temperature and high pressure filtration loss of drilling fluid, and can also provide better sealing performance in high temperature environment, effectively preventing the filtrate from entering the stratum formation and improving the stability of the well wall.

3. Drilling Fluid Sealing Performance Test

Using artificial cores to simulate formation nano-micron pores and seams formations, by measuring the average flow rate of drilling fluid system in artificial cores, through Darcy's formula, the permeability of artificial cores $K=Q\mu l/(A\Delta P)$ before and after adding the organic-inorganic nanocomposite gel sealing agent was calculated, so as to calculate the sealing rate of organic-inorganic nanocomposite gel sealing agent on artificial cores and evaluate their sealing performance. Table 2 shows a record of the effect of organic-inorganic nanocomposite gels on artificial cores. The sealing rate (initial permeability-post-sealing penetration)/initial permeability×100%.

TABLE 2

Evaluation experiment data sheet of sealing of artificial cores

| cores | drilling fluid name | core permeability/$10^{-3}$ mD | sealing rate % |
|---|---|---|---|
| 1 | Base slurry | 1.56 | — |
| 2 | Drilling fluid 1 | 0.38 | 75.40 |
| 3 | Drilling fluid 2 | 0.20 | 87.20 |
| 4 | Drilling fluid 3 | 0.12 | 92.00 |
| 5 | Drilling fluid 4 | 0.07 | 95.50 |

Note: the length of the core is 5 cm and the diameter is 2.5 cm.

From the results shown in Table 2, it can be seen that compared with the base slurry without the addition of organic-inorganic nanocomposite gel sealing agent, after adding different proportions of organic-inorganic nanocomposite gel sealing agent, the sealing or blocking rate of the core increases, and when the organic-inorganic nanocomposite gel sealing agent is added to 12 g, the sealing rate of the core reaches 92%, which shows that the organic-inorganic nanocomposite gel sealing agent can effectively seal or block the micro pores and seams, thereby preventing the drilling fluid from entering the core.

The above description is only a preferred embodiment of the present invention only, not any formal limitation of the present invention, although the present invention has been disclosed in a preferred embodiment as above, however not to limit the present invention, any skilled person familiar with the present profession, without departing from the scope of the technical solution of the present invention, when the technical content disclosed above may be used to make some changes or modified to equivalent embodiments of the equivalent embodiment, but all the content that is not separated from the technical solution of the present invention, Any simple modifications, equivalent changes and modifications made according to the technical substance of the present invention, according to the technical substance of the present invention, remain within the scope of the technical solution of the present invention.

What is claimed is:

1. A method for preparing an organic-inorganic nanocomposite gel sealing agent, comprising the following steps:
   (1) modification of nano-molybdenum disulfide: place nano-molybdenum disulfide in 75-80° C. vacuum drying tank for 10-12 h to dry, add 2-3 g of the dry nano-molybdenum disulfide to 40-50 ml of ethanol/water to form a dispersion, ultrasonicate for 40-50 min, then add 2-3 g of 3-aminopropyltriethoxysilane while stirring, react 8-10 h at 75-80° C., wash with ethanol and repeat 3-5 times before placing in 55-60° C. vacuum drying tank for 8-10 h to obtain modified nano-molybdenum disulfide;
   (2) preparation of the organic-inorganic nanocomposite gel:
   ① add the modified molybdenum disulfide to a reactor with ultra-pure water and ultrasound for 10-15 min to form a dispersion;

② add comonomer of 2-ethyl acrylic acid and N, N-dimethylacrylamide, crosslinker of N, N-methylene bisacrylamide, stir rapidly to dissolve under nitrogen 20-30 min;

③ warm the reaction system to 55-60° C. while stirring, add ammonium persulphate and keep at a constant reaction temperature for 3-4 h;

④ after the reaction is completed, the temperature is reduced to 20-25° C., and the prepared sample is washed with distilled water to neutral, then dried in 60-70° C. oven;

⑤ grind the dried sample.

2. The method for preparing the organic-inorganic nanocomposite gel sealing agent according to claim 1, wherein the amount of the modified nano molybdenum disulfide is 5-15% of the total weight of 2-ethyl acrylic acid and N, N-dimethylacrylamide; the amount of 2-ethyl acrylic acid is in the range of 3-3.5 g; 2-ethyl acrylic acid and N, N-dimethylacrylamide are in the weight ratio in the range of 1:1 to 1.5; the amount of N, N-methylene bisacrylamide is in the range of 1% to 3%; and the amount of ammonium persulphate is in a range of 1% to 3%.

3. An oil-based drilling fluid, wherein the drilling fluid comprises an organic-inorganic nanocomposite gel sealing agent prepared according to the method of claim 1 or claim 2.

4. The oil-based drilling fluid according to claim 3, wherein the drilling fluid includes the following components: 70-100 parts of white oil, 0.5-1 part of main emulsifier, 1-3 parts of serial dilutifiers, 5-10 parts of filter loss reducing agent, 2-5 parts of organic soil, 0.5-5 parts of quicklime, 10-30 parts of $CaCl_2$ brine with 20-25% concentration of $CaCl_2$, 0.5-2 parts of wetting agent, 10-30 parts of heavy crystal stones, and 1-5 parts of the organic-inorganic nanocomposite gel sealing agent.

5. The oil-based drilling fluid according to claim 4, wherein the filter loss reducing agent is oxidation asphalt, and a density of the heavy crystal stone is 4.2 g/cm$^3$.

6. The oil-based drilling fluid according to claim 4, wherein a pH of the oil-based drilling fluid is in the range of 8.5 to 10.

7. The oil-based drilling fluid according to claim 4, wherein the oil-based drilling fluid has a density in the range of 1.20-2.20 g/cm$^3$ before adding the organic-inorganic nanocomposite gel sealing agent.

\* \* \* \* \*